United States Patent
Cho et al.

(10) Patent No.: US 9,611,395 B2
(45) Date of Patent: Apr. 4, 2017

(54) ULTRA-HYDROPHILIC ANTIREFLECTIVE COATING COMPOSITION COMPRISING SILOXANE COMPOUND, ULTRA-HYDROPHILIC ANTIREFLECTIVE FILM USING SAME, AND METHOD FOR PREPARING ULTRA-HYDROPHILIC ANTIREFLECTIVE FILM

(71) Applicant: LG Hausys, Ltd., Seoul (KR)

(72) Inventors: Hong-Kwan Cho, Anyang-si (KR); Won-Kook Kim, Daejeon-si (KR); Joo Hee Hong, Uiwang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/438,134

(22) PCT Filed: Oct. 30, 2013

(86) PCT No.: PCT/KR2013/009694
§ 371 (c)(1),
(2) Date: Apr. 23, 2015

(87) PCT Pub. No.: WO2014/073815
PCT Pub. Date: May 15, 2014

(65) Prior Publication Data
US 2015/0291803 A1  Oct. 15, 2015

(30) Foreign Application Priority Data
Nov. 7, 2012 (KR) .......................... 10-2012-0125474

(51) Int. Cl.
| | |
|---|---|
| *C08K 7/22* | (2006.01) |
| *C09D 5/00* | (2006.01) |
| *C08J 5/18* | (2006.01) |
| *C09D 183/02* | (2006.01) |
| *G02B 1/11* | (2015.01) |
| *G02B 27/00* | (2006.01) |
| *B05D 3/00* | (2006.01) |
| *C09D 7/12* | (2006.01) |
| *C09D 183/04* | (2006.01) |
| *G02B 1/111* | (2015.01) |
| *C08K 7/26* | (2006.01) |
| *C08G 77/02* | (2006.01) |
| *C08G 77/04* | (2006.01) |

(52) U.S. Cl.
CPC .............. *C09D 5/006* (2013.01); *B05D 3/007* (2013.01); *C08J 5/18* (2013.01); *C09D 7/1216* (2013.01); *C09D 183/02* (2013.01); *C09D 183/04* (2013.01); *G02B 1/11* (2013.01); *G02B 1/111* (2013.01); *G02B 27/0006* (2013.01); *C08G 77/02* (2013.01); *C08G 77/04* (2013.01); *C08K 7/26* (2013.01)

(58) Field of Classification Search
CPC .......................................................... C08K 7/22
USPC .................................................. 523/218, 216
See application file for complete search history.

(56) References Cited

U.S. PATENT DOCUMENTS

2005/0109238 A1    5/2005  Yamaki et al.

FOREIGN PATENT DOCUMENTS

| JP | 2000233467 A | 8/2000 |
|---|---|---|
| JP | 2002200690 A | 7/2002 |
| JP | 5046482 B2 | 10/2012 |
| KR | 20040070225 A | 8/2004 |
| KR | 20070011650 A | 1/2007 |
| KR | 20090087285 A | 8/2009 |
| KR | 20090118724 A | 11/2009 |
| KR | 20100112740 A | 10/2010 |
| TW | I302559 B | 11/2008 |

OTHER PUBLICATIONS

International Search Report for PCT/KR2013/009694 mailed on Dec. 19, 2013.
Office Action dated Jan. 23, 2017 from Taiwan Intellectual Property Office (TIPO) for Taiwanese Application No. 102140545, citing the above reference(s).
Geng Xing, "Manual for Modem Aqueous Coating Material Additives", Jun. 2007, p. 597-598, Total 7 pages.
Chinese Office Action issued on Nov. 16, 2016 for Chinese Application No. 201380058359.8, citing the above reference(s).

Primary Examiner — Edward Cain
(74) Attorney, Agent, or Firm — Hauptman Ham, LLP

(57) ABSTRACT

The present invention relates to an ultra-hydrophilic antireflective coating composition, to an ultra-hydrophilic antireflective film using the same, and to a method for preparing the ultra-hydrophilic antireflective film, wherein the ultra-hydrophilic antireflective coating composition can form a coating layer having a low refractive index and ultra-hydrophilicity. More particularly, the present invention relates to an antireflective film and to a method for preparing same wherein the antireflective film has excellent hydrophilicity and minimize the reflectivity by forming the coating layer using an ultra-hydrophilic antireflective coating composition including a siloxane compound as a binder.
The ultra-hydrophilic antireflective film using the ultra-hydrophilic antireflective coating composition has excellent antireflective effects and a self-cleaning function. Therefore, it is expected that the ultra-hydrophilic antireflective film can be applied to various display devices such as devices for the outdoors.

16 Claims, No Drawings

ULTRA-HYDROPHILIC ANTIREFLECTIVE COATING COMPOSITION COMPRISING SILOXANE COMPOUND, ULTRA-HYDROPHILIC ANTIREFLECTIVE FILM USING SAME, AND METHOD FOR PREPARING ULTRA-HYDROPHILIC ANTIREFLECTIVE FILM

DESCRIPTION

CROSS REFERENCE TO RELATED APPLICATION

This application claims the priority of Korean Patent Application No. 10-2012-0125474 filed on Nov. 7, 2012 in the Korean Patent and Trademark Office. Further, this application is the National Phase application of International Application No. PCT/KR2013/009694 filed on Oct. 30, 2013, which is incorporated herein by reference in its entirety.

Technical Field

The present invention relates to an ultra-hydrophilic anti-reflective coating composition which can form a coating layer having a low index of refraction and ultra-hydrophilic properties, an ultra-hydrophilic anti-reflective film using the same, and a method for manufacturing the ultra-hydrophilic anti-reflective film. More particularly, the present invention relates to an ultra-hydrophilic anti-reflective film having minimized reflectance and good ultra-hydrophilic properties by forming a coating layer using an ultra-hydrophilic anti-reflective coating composition including a binder formed by polymerization of a siloxane compound, and a method for manufacturing the same.

Background Art

When a display is exposed to external light such as various illumination and natural light, an image formed inside the display is not clearly focused on an eye, thereby causing deterioration in contrast of the display. Due to such deterioration in contrast, a person has a difficulty in viewing a screen and suffers from eye fatigue or a headache. For this reason, there is strong demand for anti-reflection.

In a substrate on which a single-layer anti-reflective film is formed, when an index of refraction of the substrate is defined as $n_s$ and an index of refraction of the single-layer anti-reflective film is defined as n, a minimum reflectance R of the anti-reflective film is represented by $(n_s-n^2)^2/(n_s+n^2)^2$. Since the minimum reflectance R occurs when $n^2=n_s$, the single-layer anti-reflective film has lower reflectance as the index of refraction n thereof is closer to $(n_s)^{1/2}$. Generally, considering that an index of refraction $n_s$ of polyethylene terephthalate used as a substrate in transparent conductive films is about 1.54, it is desirable that an index of refraction n of an anti-reflective film be as close to a range of about 1.22 to about 1.24 as possible in order to reduce a reflectance R of the anti-reflective film.

In typical anti-reflective films, an anti-reflective layer is mainly disposed on a transparent substrate. For example, Japanese Patent Publication No. 2002-200690 discloses a 3-layer structure in which a hard coating layer, a 1 μm or less thick high refractive-index layer, and a low refractive-index layer are stacked in order from a transparent substrate.

In addition, to simplify a manufacturing process, Japanese Patent Publication No. 2000-233467 discloses a 2-layer structure in which the hard coating layer and the low refractive-index layer are stacked with omission of the high refractive-index layer from the anti-reflective layer as set forth above.

Due to development of hollow silica particles, which are a low refractive material, low refractive coating materials having an extremely low index of refraction have been studied. However, a low refractive coating material developed using an existing acrylic resin has not reached an index of refraction of 1.22 to 1.24, which is a theoretically optimum value for anti-refraction. To overcome this problem, although efforts to reduce an index of refraction by addition of a fluorine-containing polymer material have been made, there occurred a problem of excessively high surface energy of a coating surface. Thus, an anti-reflective coating layer having a hydrophobic surface has been mainly developed.

When the anti-reflective coating layer is applied to outdoor displays, it is very advantageous that the coating layer have self-cleaning functions in consideration of the surrounding environment, and such self-cleaning functions can be realized by ultra-hydrophilic properties. However, an anti-reflective coating layer having ultra-hydrophilic properties is not realized in the art.

Disclosure

Technical Problem

With continuous studies and efforts for development of an ultra-hydrophilic anti-reflective film in which a silica coating layer having a low index of refraction and ultra-hydrophilic properties is formed on a substrate, the inventors of the present invention have found that, when a coating liquid including a binder formed by polymerization of a siloxane compound, it is possible to manufacture an ultra-hydrophilic anti-reflective film which has a transmittance of 94% or higher, a luminous reflectance of 2.0% or less, and a water contact angle of 10° or less by including a coating layer having ultra-hydrophilic properties and a low index of refraction, thereby completing the present invention.

Therefore, it is an aspect of the present invention to provide an anti-reflective film which exhibits minimized reflectance, enhanced light transmittance, and ultra-hydrophilic functions by forming an ultra-hydrophilic anti-reflective layer using a coating liquid including a specific siloxane compound binder, and a method for manufacturing the anti-reflective film.

Technical Solution

In accordance with one aspect of the present invention, an ultra-hydrophilic anti-reflective coating composition includes: a binder formed by polymerization of a silane compound represented by Formula 1; and hollow silica particles.

$$R^1_xSi(OR^2)_{4-x} \quad \text{[Formula 1]}$$

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying $0 \leq x < 4$.

In accordance with another aspect of the present invention, an ultra-hydrophilic anti-reflective film includes an ultra-hydrophilic low refractive-index layer formed by coating the ultra-hydrophilic coating composition as set forth above onto a surface of a substrate.

In accordance with a further aspect of the present invention, a method for manufacturing an ultra-hydrophilic anti-reflective film includes: preparing a binder by polymerization of a silane compound represented by Formula 1; preparing an ultra-hydrophilic coating composition including surface-treated hollow silica particles by adding the binder and a catalyst to hollow silica particles; coating the ultra-hydrophilic coating composition onto at least one surface of a base film; and performing heat treatment of the coated ultra-hydrophilic coating composition.

Advantageous Effects

According to the present invention, an ultra-hydrophilic anti-reflective coating layer which has a low index of refraction while realizing self-cleaning functions due to ultra-hydrophilic properties can be formed using the ultra-hydrophilic anti-reflective coating composition.

The ultra-hydrophilic anti-reflective film using the ultra-hydrophilic anti-reflective coating composition can be applied to various displays such as outdoor displays by virtue of excellent anti-reflection effects and self-cleaning functions thereof.

BEST MODE

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof.

Hereinafter, an anti-reflective coating composition, an anti-reflective film, and a method for manufacturing the anti-reflective film according to the present invention will be described in detail.

Ultra-Hydrophilic Anti-Reflective Coating Composition

In accordance with one aspect of the present invention, an ultra-hydrophilic anti-reflective coating composition includes: a binder formed by polymerization of at least one silane compound represented by Formula 1; and hollow silica particles.

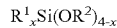    [Formula 1]

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying 0≤x<4.

The silane compound represented by Formula 1 may be a tetrafunctional alkoxy silane having four alkoxy groups when x is 0; a trifunctional alkoxy silane having three alkoxy groups when x is 1; and a bifunctional alkoxy silane having two alkoxy groups when x is 2. The silane compound represented by Formula 1 when x is 3 is not advantageous in condensation with other silane compounds represented by Formula 1, since the silane compound has only one alkoxy functional group.

In Formula 1, the $C_6$ to $C_{10}$ aryl group may include a phenyl group, a tolyl group, and the like, and the $C_3$ to $C_{10}$ alkenyl group may include an allyl group, a 1-propenyl group, a 1-butenyl group, a 2-butenyl group, a 3-butenyl group, and the like.

The silane compound may include at least one compound selected from the group consisting of tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, diphenyldiethoxysilane, and combinations thereof, without being limited thereto.

The silane compound represented by Formula 1 is subjected to hydrolysis and dehydration condensation polymerization to form a siloxane compound. In hydrolysis and dehydration condensation polymerization, an acid catalyst may be used. Specifically, nitric acid, hydrochloric acid, sulfuric acid, acetic acid, or the like may be used.

The siloxane compound acts as a binder while serving to treat surfaces of the hollow silica particles.

The siloxane compound has a weight average molecular weight of 1,000 to 100,000, preferably 2,000 to 50,000, more preferably 5,000 to 20,000. If the weight average molecular weight is less than about 1,000, it is difficult to form a coating layer having desired ultra-hydrophilic properties and low index of refraction, whereas, if the weight average molecular weight is greater than about 100,000, there is a problem of deterioration in light transmittance of an ultra-hydrophilic anti-reflective film.

The hollow silica particles refer to silica particles which are derived from a silicon compound or an organic silicon compound and have an empty space on the surface thereof and/or therein.

The hollow silica particles may be dispersed in a dispersion medium (water or organic solvent) to form a colloid having a solid content of 5% by weight (wt %) to 40 wt %. Here, an organic solvent capable of being used as the dispersion medium may include: alcohols such as methanol, isopropyl alcohol (IPA), ethylene glycol, butanol, and the like; ketones such as methyl ethyl ketone, methyl isobutyl ketone (MIBK), and the like; aromatic hydrocarbons such as toluene, xylene, and the like; amides such as dimethyl formamide, dimethyl acetamide, N-methyl pyrrolidone, and the like; esters such as ethyl acetate, butyl acetate, γ-butyrolactone, and the like; ethers such as tetrahydrofuran, 1,4-dioxane, and the like; and mixtures thereof. However, when a colloid solution in which the hollow silica particles are dispersed in a dispersion medium is used, as described above, it is desirable that the amount of the hollow silica be adjusted within the range as set forth above in consideration of solid content and the like.

In addition, it is advantageous in maintenance of transparency of a film and in exhibition of anti-reflection thereof that the hollow silica particles have a number average diameter of 1 nm to 1,000 nm, specifically 5 nm to 500 nm, more specifically 10 nm to 100 nm.

The binder of the siloxane compound is present in an amount of 10 parts by weight to 120 parts by weight, preferably 20 parts by weight to 100 parts by weight, the most preferably 40 parts by weight to 80 parts by weight, based on 100 parts by weight of the hollow silica particles. If the amount of the binder is less than 10 parts by weight, there is a problem of whitening of a coating surface, whereas if the amount of the binder is greater than 120 parts by weight, there is a problem of significant deterioration in anti-reflection of the coating layer.

The anti-reflective coating composition may include an acid catalyst to promote surface treatment of the hollow silica particles with the binder, and the acid catalyst may be any acid catalyst generally used in the art without limitation. Preferably, the acid catalyst is nitric acid or hydrochloric acid. The acid catalyst is preferably present in an amount of 0.1 parts by weight to 20 parts by weight based on 100 parts by weight of the hollow silica particles. In preparation of the anti-reflective coating composition, it is advantageous that the coating composition be adjusted to a pH of about 2 to about 4 using the acid catalyst.

Ultra-Hydrophilic Anti-Reflective Film

In accordance with another aspect of the present invention, there is provided an ultra-hydrophilic anti-reflective film including an ultra-hydrophilic low refractive-index layer formed by coating the ultra-hydrophilic anti-reflective coating composition as set forth above onto a surface of a substrate.

The substrate may include various substrates, such as transparent polymer resins and the like, used for typical liquid crystal displays and the like. Specifically, the substrate may include triacetyl cellulose (TAC), polyethylene terephthalate (PET), polyethylene naphthalate (PEN), polyethersulfone (PES), polycarbonate (PC), polypropylene (PP), norbornene resins, and the like.

When the substrate is formed of PET, a PET film preferably has a thickness of about 10 µm to about 300 µm, more preferably about 20 µm to about 100 µm. If the thickness of the transparent substrate is less than about 10 µm, the substrate has a problem in mechanical strength, and if the thickness of the transparent substrate is greater than about 300 µm, there is a possibility that the substrate exhibits poor light transmittance.

The ultra-hydrophilic low refractive-index layer formed of the ultra-hydrophilic anti-reflective coating composition has an index of refraction of 1.24 to 1.30.

The ultra-hydrophilic low refractive-index layer preferably has a thickness of 1 nm to 1,000 nm, more preferably 10 nm to 500 nm. If the thickness is less than 1 nm, there is a problem of insignificant anti-reflection of the low refractive-index layer, and if the thickness is greater than 1,000 nm, there is a problem of deterioration in adhesion of the low refractive-index layer.

The ultra-hydrophilic anti-reflective film according to the present invention has a transmittance of 94% or more and a luminous reflectance of 0.5% to 2.0%, and thus can exhibit excellent anti-reflection.

Method for Manufacturing Ultra-Hydrophilic Anti-Reflective Film

In accordance with a further aspect of the present invention, a method for manufacturing an ultra-hydrophilic anti-reflective film includes: preparing a binder by polymerization of a silane compound represented by Formula 1; preparing an ultra-hydrophilic coating composition including surface-treated hollow silica particles by adding the binder and an acid catalyst to hollow silica particles; coating the ultra-hydrophilic coating composition onto at least one surface of a base film; and performing heat treatment of the coated ultra-hydrophilic coating composition.

The binder may be prepared as a siloxane compound by mixing at least one silane compound represented by Formula 1 in a solvent in the presence of an acid catalyst, followed by dehydration and polymerization.

The prepared binder is mixed with the hollow silica particles in a solvent in the presence of the acid catalyst, and used in surface treatment of the hollow silica particles. The binder and the hollow silica particles are preferably mixed at 20° C. to 40° C. for about 5 hours to about 50 hours, more preferably 10 hours to 40 hours, most preferably 20 hours to 30 hours while stirred.

As described above, the coating composition may include 10 parts by weight to 120 parts by weight of the binder and 0.1 parts by weight to 20 parts by weight of the acid catalyst, based on 100 parts by weight of the hollow silica particles.

In addition, in preparation of the coating composition, the coating composition needs to be temporarily controlled as to pH thereof. Here, the coating composition is preferably controlled to a pH of 4 to 9, more preferably 4 to 8, most preferably 5 to 8. Such pH control can increase the amount of OH groups in the coating composition components, thereby reducing a contact angle on a surface of the coating composition during coating. Further, a pH control agent and the like may be used for pH control of the coating composition, and the pH control agent may include ammonia, organic amines, metal hydroxide (LiOH, KOH, NaOH) solutions and the like.

The coating composition obtained through mixing as set forth above is coated onto at least one surface of the base film. Here, coating may be performed by one method selected from among gravure coating, slot die coating, spin coating, spray coating, bar coating, and dip coating, without being limited thereto.

The coating composition may be coated to a thickness of 1 nm to 1,000 nm onto one surface of the base film, followed by heat treatment at 50° C. to 200° C., thereby forming an ultra-hydrophilic anti-reflective layer. Specifically, the coated coating composition may be dried at a high temperature of 100° C. to 200° C. for about 1 minute to about 10 minutes to remove the solvent, followed by aging at 50° C. to 100° C. for about 10 hours to 100 hours, thereby forming the ultra-hydrophilic anti-reflective layer.

Hereinafter, the present invention will be explained in more detail with reference to some examples.

It should be understood that these examples are provided for illustration only and are not to be construed in any way as limiting the present invention.

Example 1

1. Preparation of Siloxane Compound Binder 100 parts by weight of water, 460 parts by weight of isopropanol, and 38 parts by weight of 0.1 M $HNO_3$ were placed in a reactor, followed by stirring for 10 minutes. Next, 400 parts by weight of tetraethoxysilane (tetraethyl orthosilicate, TEOS) was slowly introduced into the reactor through a funnel for 30 minutes. Next, the components were stirred at 50° C. for 2 hours, followed by cooling to room temperature, and then stirred again at a speed of 200 rpm for 24 hours, thereby obtaining a transparent binder solution. It was confirmed that the solution had a solid content of 11.5 wt % and a pH of 3.5. The transparent solution was used in manufacture of a coating composition in the following stage without a separate purification process.

2. Preparation of ultra-hydrophilic anti-reflective coating composition 100 parts by weight of the prepared binder solution, 127 parts by weight of isopropanol, 133 parts by weight of a hollow silica particle-isopropanol dispersion sol (Thrylya 4110, JGC C&C Co., Ltd., 20% w/w) (including 27 parts by weight of hollow silica particles) having a number average diameter of 60 nm, and 3 parts by weight of $NH_4OH$ were placed in a reactor and stirred at room temperature for 24 hours, followed by introducing 6.7 parts by weight of 0.8 $HNO_3$, thereby preparing an ultra-hydrophilic anti-reflective coating composition. It was confirmed that the prepared ultra-hydrophilic anti-reflective coating composition had a solid content of 10 wt % and a pH of 2.0, wherein the binder was present in an amount of 43 parts by weight based on 100 parts by weight of the hollow silica particles.

3. Manufacture of ultra-hydrophilic anti-reflective film

The prepared ultra-hydrophilic anti-reflective coating composition was coated to a thickness of 100 nm onto a 50 μm thick PET film using a Mayer bar, followed by drying at 130° C. for 2 minutes, thereby forming an ultra-hydrophilic anti-reflective coating layer. Next, the coating layer was subjected to aging in an oven at 60° C. for 24 hours, thereby manufacturing a final ultra-hydrophilic anti-reflective film.

Example 2

An ultra-hydrophilic anti-reflective coating composition and an ultra-hydrophilic anti-reflective film were manufactured in the same manner as in Example 1 except that, in preparation of the coating composition, 107 parts by weight of isopropanol and 102 parts by weight of a hollow silica particle-isopropanol dispersion sol (Thrylya 4110, JGC C&C Co., Ltd., 20% w/w) having a number average diameter of 60 nm were used. It was confirmed that the prepared ultra-hydrophilic anti-reflective coating composition had a solid content of 10 wt % and a pH of 2.1, wherein the binder was present in an amount of 56 parts by weight based on 100 parts by weight of the hollow silica particles.

Example 3

An ultra-hydrophilic anti-reflective coating composition and an ultra-hydrophilic anti-reflective film were manufactured in the same manner as in Example 1 except that, in preparation of the coating composition, 50 parts by weight of isopropanol and 48 parts by weight of a hollow silica particle-isopropanol dispersion sol (Thrylya 4110, JGC C&C Co., Ltd., 20% w/w) having a number average diameter of 60 nm were used. It was confirmed that the prepared ultra-hydrophilic anti-reflective coating composition had a solid content of 10 wt % and a pH of 1.8, wherein the binder was present in an amount of 120 parts by weight based on 100 parts by weight of the hollow silica particles.

Example 4

An ultra-hydrophilic anti-reflective coating composition and an ultra-hydrophilic anti-reflective film were manufactured in the same manner as in Example 1 except that, in preparation of the coating composition, 500 parts by weight of isopropanol and 520 parts by weight of a hollow silica particle-isopropanol dispersion sol (Thrylya 4110, JGC C&C Co., Ltd., 20% w/w) having a number average diameter of 60 nm were used. It was confirmed that the prepared ultra-hydrophilic anti-reflective coating composition had a solid content of 10 wt % and a pH of 2.3, wherein tetraethoxysilane was present in an amount of 11 parts by weight based on 100 parts by weight of the hollow silica particles.

Evaluation

1. Measurement of Water Contact Angle

Water contact angle was measured on each of the manufactured ultra-hydrophilic anti-reflective films using an OCA200 contact angle tester (Dataphysics Co., Ltd.). Results are shown in Table 1.

As shown in Table 1, the ultra-hydrophilic anti-reflective films of Examples had a water contact angle of 10° or less. From the results, it was confirmed that the ultra-hydrophilic anti-reflective films of Examples exhibited good ultra-hydrophilic properties.

2. Measurement of Index of Refraction

Index of refraction of the coating layer on the manufactured ultra-hydrophilic anti-reflective film was measured at wavelengths of 532 nm, 632.8 nm, and 830 nm using a prism coupler, followed by calculation of index of refraction at 550 nm using Cauchy's dispersion equation. Results are shown in Table 1.

As shown in Table 1, it was confirmed that the ultra-hydrophilic anti-reflective coating layers of Examples could realize an index of refraction value, such as 1.24 and 1.30, close to a theoretically optimum value when the PET substrate was used.

3. Transmittance and Minimum Reflectance

Transmittance of each of the manufactured ultra-hydrophilic anti-reflective films was measured using a CM-5 spectrophotometer (Konica Minolta Co., Ltd.). In addition, a back surface of each of the ultra-hydrophilic anti-reflective films was subjected to blackening treatment, followed by measurement of luminous reflectance and minimum reflectance. Results are shown in Table 1.

As shown in Table 1, the ultra-hydrophilic anti-reflective films of Examples had a transmittance of 94% or higher, a luminous reflectance of 0.9% to 1.3%, and a minimum reflectance of 0.8% to 1.2%. From the results, it was confirmed that the ultra-hydrophilic anti-reflective films of Examples exhibited excellent anti-reflection.

TABLE 1

| | Contact angle (°) | Index of refraction | Transmittance (D65) (%) | Luminous reflectance (D65) (%) | Minimum reflectance (%) |
|---|---|---|---|---|---|
| Example 1 | 5 | 1.24 | 95.0 | 0.9 | 0.8 |
| Example 2 | 6 | 1.26 | 94.8 | 1.3 | 1.2 |
| Example 3 | 6 | 1.30 | 94.5 | 1.2 | 1.1 |
| Example 4 | 5 | 1.23 | 95.1 | 0.9 | 0.8 |

Although the present invention has been described with reference to some embodiments, it should be understood that the embodiments are provided for illustration only, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. An ultra-hydrophilic anti-reflective coating composition comprising:
    a binder formed by polymerization of a silane compound represented by Formula 1; and
    surface-treated hollow silica particles treated by a pH control agent, $$R^1_x Si(OR^2)_{4-x}$$ [Formula 1]

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying $0 \le x < 4$.

2. The coating composition according to claim 1, wherein the silane compound represented by Formula 1 comprises at least one compound selected from among tetramethoxysilane, tetraethoxysilane, tetrapropoxysilane, tetraisopropoxysilane, tetra-n-butoxysilane, tetra-sec-butoxysilane, tetra-tert-butoxysilane, trimethoxysilane, triethoxysilane, methyltrimethoxysilane, methyltriethoxysilane, ethyltrimethoxysilane, ethyltriethoxysilane, propyltrimethoxysilane, propyltriethoxysilane, isobutyltriethoxysilane, cyclohexyltrimethoxysilane, phenyltrimethoxysilane, phenyltriethoxysilane, vinyltrimethoxysilane, vinyltriethoxysilane, allyltrimethoxysilane allyltriethoxysilane, dimethyldimethoxysilane, dimethyldiethoxysilane, diphenyldimethoxysilane, or diphenyldiethoxysilane.

3. The coating composition according to claim 1, wherein the hollow silica particles have a number average diameter of 1 nm to 1,000 nm.

4. The coating composition according to claim 1, wherein the binder is present in an amount of 10 parts by weight to 120 parts by weight based on 100 parts by weight of the hollow silica particles.

5. The coating composition according to claim 1, wherein the pH control agent comprises at least one selected from among ammonia, organic amines, metal hydroxides, and mixtures thereof.

6. An ultra-hydrophilic anti-reflective film comprising an ultra-hydrophilic low refractive-index layer formed on a surface of a substrate by coating the coating composition according to claim 1onto the surface.

7. The ultra-hydrophilic anti-reflective film according to claim 6, wherein the ultra-hydrophilic anti-reflective film has a water contact angle of greater than 0° and less than or equal to 10°.

8. The ultra-hydrophilic anti-reflective film according to claim 6, wherein the ultra-hydrophilic low refractive-index layer has an index of refraction of 1.24 to 1.30.

9. The ultra-hydrophilic anti-reflective film according to claim 6, wherein the ultra-hydrophilic low refractive-index layer has a thickness of 1 nm to 1,000 nm.

10. The ultra-hydrophilic anti-reflective film according to claim 6, wherein the ultra-hydrophilic low refractive-index layer has a transmittance of 94% or higher and a luminous reflectance of 0.5% to 2.0%.

11. A method for manufacturing an ultra-hydrophilic anti-reflective film, comprising:
    preparing a binder by polymerization of a silane compound represented by Formula 1;
    preparing an ultra-hydrophilic coating composition comprising surface-treated hollow silica particles by adding the binder and a catalyst to hollow silica particles;
    coating the ultra-hydrophilic coating composition onto at least one surface of a base film; and
    performing heat treatment of the coated ultra-hydrophilic coating composition.

$$R^1_x Si(OR^2)_{4-x} \quad \text{[Formula 1]}$$

wherein $R^1$ is a $C_1$ to $C_{10}$ alkyl group, a $C_6$ to $C_{10}$ aryl group or a $C_3$ to $C_{10}$ alkenyl group, $R^2$ is a $C_1$ to $C_6$ alkyl group, and x is an integer satisfying $0 \leq x < 4$.

12. The method according to claim 11, wherein the ultra-hydrophilic coating composition comprises 10 parts by weight to 120 parts by weight of the binder and 0.1 parts by weight to 20 parts by weight of the acid catalyst.

13. The method according to claim 11, wherein the ultra-hydrophilic coating composition is prepared by adding the binder and the catalyst to the hollow silica particles, followed by stirring at 20° C. to 40° C. for 5 hours to 50 hours.

14. The method according to claim 11, wherein heat treatment is performed at a temperature of 50° C. to 200° C.

15. The method according to claim 11, further comprising: prior to preparing the ultra-hydrophilic coating composition, performing surface treatment of the hollow silica particles with a pH control agent.

16. The method according to claim 15, wherein the pH control agent comprises at least one selected from among ammonia, organic amines, metal hydroxides, and mixtures thereof.

\* \* \* \* \*